US009783007B2

(12) United States Patent
Hikita

(10) Patent No.: US 9,783,007 B2
(45) Date of Patent: Oct. 10, 2017

(54) OFF-ROAD PNEUMATIC TIRE

(71) Applicant: SUMITOMO RUBBER INDUSTRIES LTD., Kobe-shi (JP)

(72) Inventor: Masahiro Hikita, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 525 days.

(21) Appl. No.: 14/534,620

(22) Filed: Nov. 6, 2014

(65) Prior Publication Data

US 2015/0122383 A1 May 7, 2015

(30) Foreign Application Priority Data

Nov. 7, 2013 (JP) ................................. 2013-231058

(51) Int. Cl.
*B60C 11/11* (2006.01)
*B60C 11/13* (2006.01)
*B60C 11/03* (2006.01)

(52) U.S. Cl.
CPC ........... *B60C 11/11* (2013.01); *B60C 11/0318* (2013.01); *B60C 11/1369* (2013.01); *B60C 2200/10* (2013.01); *B60C 2200/14* (2013.01)

(58) Field of Classification Search
CPC .................................................. B60C 11/1369
See application file for complete search history.

(56) References Cited

U.S. PATENT DOCUMENTS

| 4,617,976 A | * | 10/1986 | Kawajiri | ............... B60C 11/032 152/209.11 |
| 5,137,068 A | * | 8/1992 | Loidl | ...................... B60C 11/11 152/209.27 |
| D340,424 S | * | 10/1993 | Kawajiri | ...................... D12/571 |
| 6,102,093 A | * | 8/2000 | Nakagawa | .............. B60C 11/11 152/209.18 |
| D577,653 S | * | 9/2008 | Sueishi | ........................ D12/512 |
| D579,406 S | * | 10/2008 | Sueishi | ........................ D12/536 |
| D583,303 S | * | 12/2008 | Sueishi | ........................ D12/536 |
| D637,140 S | * | 5/2011 | Hikita | ........................ D12/536 |

(Continued)

FOREIGN PATENT DOCUMENTS

JP           04293603 A   * 10/1992
JP    2007-168651       7/2007

(Continued)

*Primary Examiner* — Jodi C Franklin
(74) *Attorney, Agent, or Firm* — Oblon, McClelland, Maier & Neustadt, L.L.P.

(57) ABSTRACT

An off-road pneumatic tire has a tread having an outer surface forming a tread surface, the tread including a body and multiple blocks projecting from the body substantially outward in radial direction. The blocks have a center block group, a pair of shoulder block groups and a pair of middle block groups. The center group includes center blocks at interval in circumferential direction on plane of equator. Each shoulder group includes shoulder blocks at interval in the circumferential direction on an edge of the tread surface. Each middle group includes middle blocks at interval in the circumferential direction between the center and one shoulder groups. The center group has units each having first, second, third and fourth center blocks in the order of the first, second, third and fourth blocks in the circumferential direction.

20 Claims, 6 Drawing Sheets

(56) References Cited

U.S. PATENT DOCUMENTS

| | | | |
|---|---|---|---|
| 8,100,158 B2 * | 1/2012 | Sueishi | B60C 11/11 152/209.11 |
| 8,820,371 B2 * | 9/2014 | Hikita | B60C 11/11 152/209.11 |
| 2008/0110542 A1 * | 5/2008 | Sueishi | B60C 11/11 152/209.25 |
| 2008/0245457 A1 * | 10/2008 | Sueishi | B60C 11/01 152/209.11 |
| 2011/0024009 A1 * | 2/2011 | Nakamura | B60C 11/032 152/209.1 |
| 2011/0308681 A1 * | 12/2011 | Nakamura | B60C 11/032 152/209.18 |
| 2012/0018067 A1 * | 1/2012 | Hikita | B60C 11/11 152/209.8 |
| 2012/0024440 A1 * | 2/2012 | Ishida | B60C 11/11 152/209.1 |
| 2012/0024443 A1 * | 2/2012 | Ishida | B60C 11/11 152/209.18 |
| 2012/0160381 A1 * | 6/2012 | Ishida | B60C 11/11 152/209.11 |
| 2012/0267019 A1 * | 10/2012 | Gatti | B60C 9/06 152/209.18 |
| 2012/0305154 A1 * | 12/2012 | Hikita | B60C 11/11 152/209.11 |
| 2013/0284333 A1 * | 10/2013 | Ishida | B60C 11/11 152/209.18 |
| 2014/0209227 A1 * | 7/2014 | Maeda | B60C 11/11 152/209.22 |
| 2014/0318675 A1 * | 10/2014 | Chen | B60C 11/033 152/209.11 |

FOREIGN PATENT DOCUMENTS

| | | | | |
|---|---|---|---|---|
| JP | 2007-182096 | | 7/2007 | |
| JP | 2007168651 A | * | 7/2007 | ........... B60C 11/005 |
| JP | 2007182096 A | * | 7/2007 | |

* cited by examiner

OFF-ROAD PNEUMATIC TIRE

CROSS-REFERENCE TO RELATED APPLICATIONS

The present application is based upon and claims the benefit of priority to Japanese Patent Application No. 2013-231058, filed Nov. 7, 2013, the entire contents of which are incorporated herein by reference.

BACKGROUND OF THE INVENTION

Field of the Invention

The present invention relates to an off-road pneumatic tire. More specifically, the present invention relates to a pneumatic tire for a two-wheeled vehicle traveling on an off-road.

Description of Background Art

A tread of a tire for a two-wheeled vehicle traveling on an off-road has a large number of blocks. These blocks form a block pattern. The block pattern affects traveling performance. From a viewpoint of improving traction performance, various studies are being performed on the blocks and the block pattern that is formed by the blocks. Examples of such studies are described in Japanese Patent Laid-Open Publication No. 2007-182096 and Japanese Patent Laid-Open Publication No. 2007-168651. The entire contents of these publications are incorporated herein by reference.

SUMMARY OF THE INVENTION

According to one aspect of the present invention, an off-road pneumatic tire has a tread having an outer surface forming a tread surface, the tread including a body and multiple blocks projecting from the body substantially outward in a radial direction. The blocks have a center block group, a pair of shoulder block groups and a pair of middle block groups. The center block group includes center blocks positioned at an interval in a circumferential direction on a plane of an equator. Each of the shoulder block groups includes shoulder blocks positioned at an interval in the circumferential direction on an edge of the tread surface. Each of the middle block groups includes middle blocks positioned at an interval in the circumferential direction between the center block group and one of the shoulder block groups. The center block group has units each having a first center block, a second center block, a third center block and a fourth center block positioned in the order of the first, second, third and fourth center blocks in the circumferential direction. Each of the units has an interval D1 from the first center block to the second center block such that the interval D1 is larger than an interval D2 from the second center block to the third center block and that the interval D2 is smaller than an interval D3 from the third center block to the fourth center block. The second center block has a width which is larger than a width of the first center block. Each of the first center block and the fourth center block has a single block having a large block and each of the second center block and the third center block has a twin block having two small blocks parallel-aligned in an axial direction such that the large big block has an area of a surface which is larger than an area of a surface of each of the small blocks.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
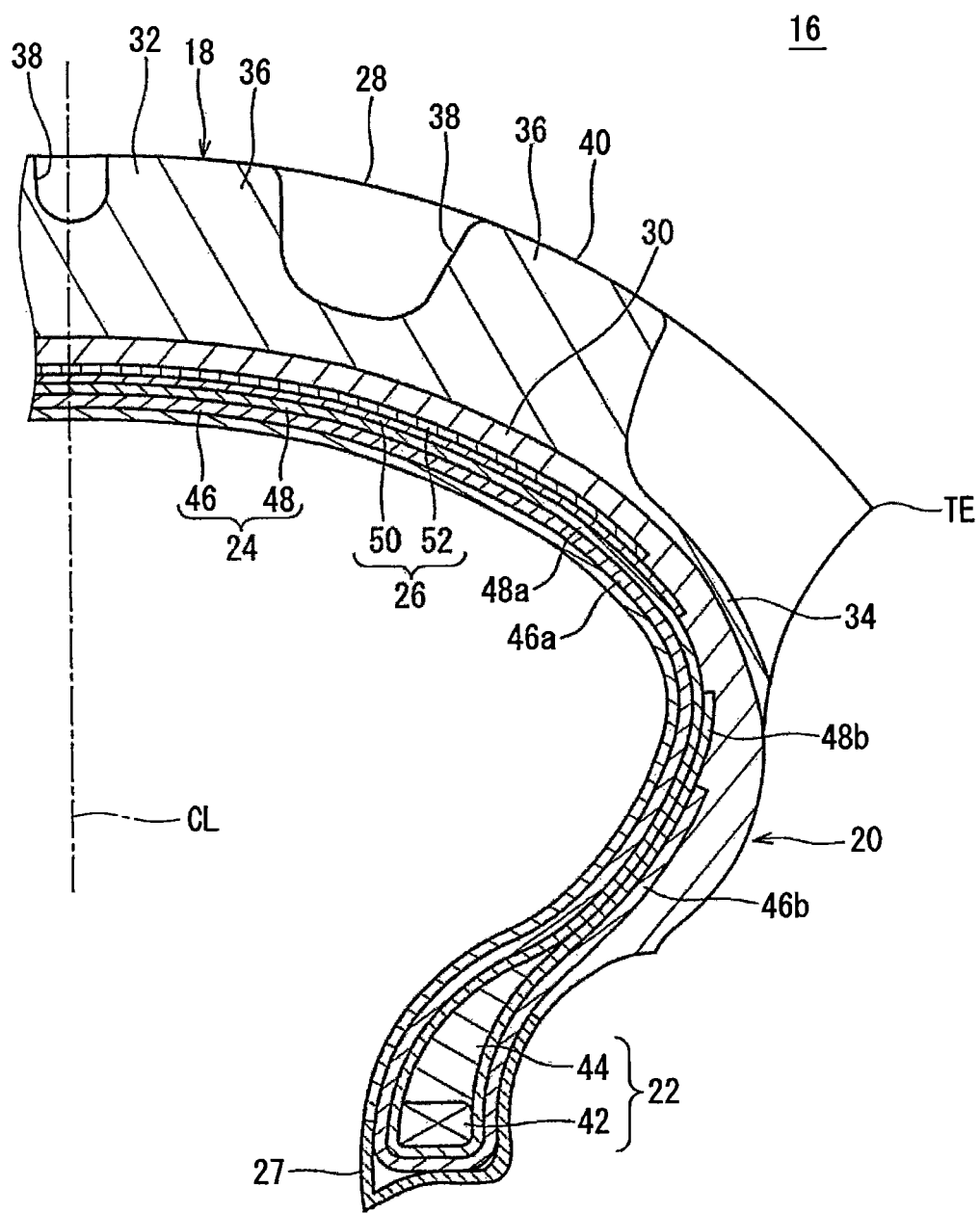
FIG. 1 illustrates a cross-sectional view in which a portion of an off-road pneumatic tire according to an embodiment of the present invention is illustrated.

The embodiments will now be described with reference to the accompanying drawings, wherein like reference numerals designate corresponding or identical elements throughout the various drawings.

FIG. 1 illustrates a pneumatic tire 16. The tire 16 is for traveling on an off-road such as traveling in a mountain forest and on a wild land, where soft dirt road surfaces and hard dirt road surfaces coexist. The tire 16 is for off-road traveling. In FIG. 1, an up-down direction is a radial direction of the tire 16; a left-right direction is an axial direction of the tire 16; a direction perpendicular to a paper surface is a circumferential direction of the tire 16. In FIG. 1, a one-dotted chain line (CL) represents a plane of an equator of the tire 16. The tire 16 has a shape that is symmetrical with respect to the plane of the equator except for a block pattern.

The tire 16 has a tread 18, a side wall 20, a bead 22, a carcass 24, a belt 26 and a chafer 27. The tire 16 is of a tube type.

The tread 18 has a shape that is convex outward in the radial direction. The tread 18 forms a tread surface 28 that is in contact with a road surface. The tread 18 has a base layer 30 and a cap layer 32. The cap layer 32 is positioned on an outer side of the base layer 30 in the radial direction. The cap layer 32 is laminated on the base layer 30. The base layer 30 is formed of a crosslinked rubber that is excellent in adhesiveness. A typical base material rubber of the base layer 30 is a natural rubber. The cap layer 32 is formed of a crosslinked rubber that is excellent in wear resistance, heat resistance and grip performance.

The cap layer 32 has a body 34 and a large number of blocks 36. The body 34 is laminated on the base layer 30. The blocks 36 project from the body 34 substantially outward in the radial direction. Neighboring blocks 36 are separated from each other by a groove 38. By engraving the groove 38 on the tread surface 28, the block pattern is formed. A surface 40 of a block 36 forms a portion of the tread surface 28. On a flat and smooth road surface, the surfaces 40 of the blocks 36 are mainly in contact with the road surface. On a soft ground, a portion of the tire 16 is buried and the blocks 36 scratch mud. The blocks 36 contribute to the traction performance. The large number of the blocks 36 that are provided in the tread 18 of the tire 16 each have a height ranging from 6 mm to 16 mm.

The side wall 20 extends from an edge of the tread 18 substantially inwardly in the radial direction. The side wall 20 is positioned on an outer side of the carcass 24 in the axial direction. The side wall 20 absorbs an impact from a road surface by deflection. Further, the side wall 20 prevents the carcass 24 from being externally damaged. The side wall 20 is formed of a crosslinked rubber. In the tire 16, the side wall 20 is integrated with the base layer 30 of the tread 18.

The bead 22 is positioned substantially on a more inner side in the radial direction than the side wall 20. The bead 22 has a core 42 and an apex 44 that extends outward from the core 42 in the radial direction. The core 42 is ring-shaped. The core 42 includes a wound non-stretchable wire. A typical material of the wire is steel. The apex 44 is tapered outward in the radial direction. The apex 44 is formed of a high-hardness crosslinked rubber.

The carcass 24 includes a first ply 46 and a second ply 48. The first ply 46 and the second ply 48 extend between the beads 22 on both sides. The first ply 46 and the second ply 48 extend along inner sides of the tread 18 and the side wall 20. The first ply 46 is folded back around the core 42 from an inner side toward an outer side in the axial direction. Due to the folding back, a main part (46a) and a folding-back part (46b) are formed in the first ply 46. The second ply 48 is folded back around the core 42 from an inner side toward an outer side in the axial direction. Due to the folding back, a main part (48a) and a folding-back part (48b) are formed in the second ply 48. An edge of the folding-back part (46b) of the first ply 46 is positioned on a more inner side in the radial direction than an edge of the folding-back part (48b) of the second ply 48.

The first ply 46 and the second ply 48 each include a large number of parallel-aligned cords and a topping rubber. An absolute value of an angle formed by each of the cords with respect to the plane of the equator ranges from 65 degrees to 90 degrees. In other words, the carcass 24 has a radial structure. When the absolute value of the inclination angle is less than 90 degrees, an inclination direction of the cords of the first ply 46 is opposite to an inclination direction of the cords of the second ply 48. The cords are formed of organic fibers. Examples of preferred organic fibers include polyester fibers, nylon fibers, rayon fibers, polyethylene naphthalate fibers and aramid fibers. The carcass 24 may also be formed from a single ply.

The belt 26 is positioned on an inner side of the tread 18 in the radial direction. The belt 26 is laminated with the carcass 24. The belt 26 reinforces the carcass 24. The belt 26 includes an inner layer 50 and an outer layer 52. As can be seen from FIG. 1, in the axial direction, a width of the inner layer 50 is slightly larger than a width of the outer layer 52. Although not illustrated in the drawings, the inner layer 50 and the outer layer 52 each include a large number of parallel-aligned cords and a topping rubber. Each of the cords is inclined with respect to the plane of the equator. A typical absolute value of an inclination angle is 10 degrees or more and 35 degrees or less. An inclination direction of the cords of the inner layer 50 with respect to the plane of the equator is opposite to an inclination direction of the cords of the outer layer 52 with respect to the plane of the equator. A preferred material for the cords is steel. Organic fibers may also be used for the cords. The belt 26 may also have three or more layers.

The chafer 27 is positioned in a vicinity of the bead 22. When the tire 16 is mounted on a rim (not illustrated in the drawings), the chafer 27 is in contact with the rim. Due to the contact, the vicinity of the bead 22 is protected. In this embodiment, the chafer 27 is formed from a fabric and a rubber with which the fabric is impregnated. The chafer 27 made of a rubber alone may also be adopted.

Figure 2:
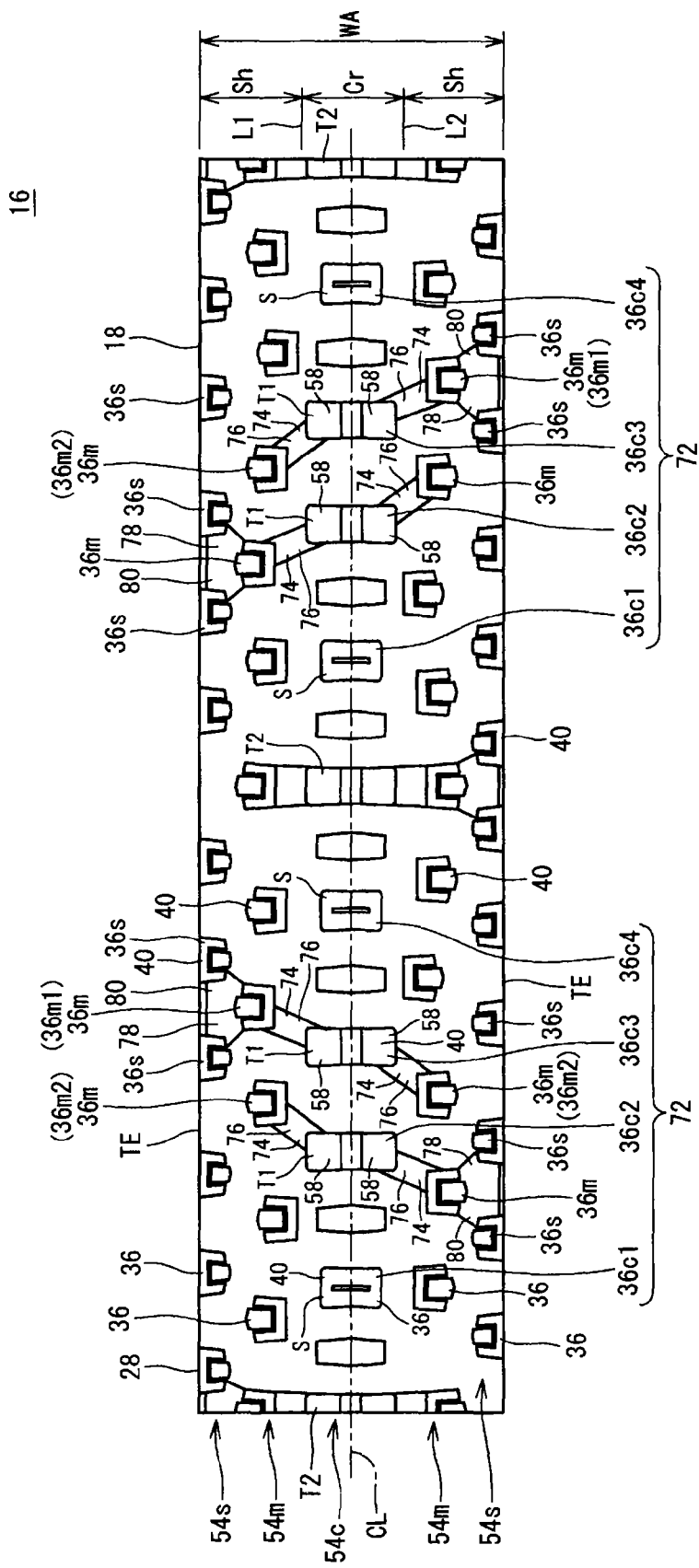
FIG. 2 illustrates a developed view in which a block pattern of the tire of FIG. 1 is illustrated.

FIG. 2 illustrates a developed view of the tread surface 28 of the tire 16. In FIG. 2, a left-right direction is the circumferential direction and an up-down direction is the axial direction. A reference numeral symbol TE represents an edge of the tread surface 28 in the axial direction.

As illustrated in FIG. 2, the blocks 36 are scattered. The surface 40 of the block 36 that coincides with the tread surface 28 is referred to as a land. A portion other than a land is inwardly recessed from the tread surface 28. The portion other than the land is referred to as a sea. In the developed view, a ratio of an area of the land to an area of the sea is referred to as a land/sea ratio. In the tire 16, from a viewpoint of durability and grip performance, it is preferable that a land/sea ratio Ra in the developed view is 10% or more and 30% or less. The land/sea ratio Ra in the developed view illustrated in FIG. 2 is 23.6%.

Figure 3:
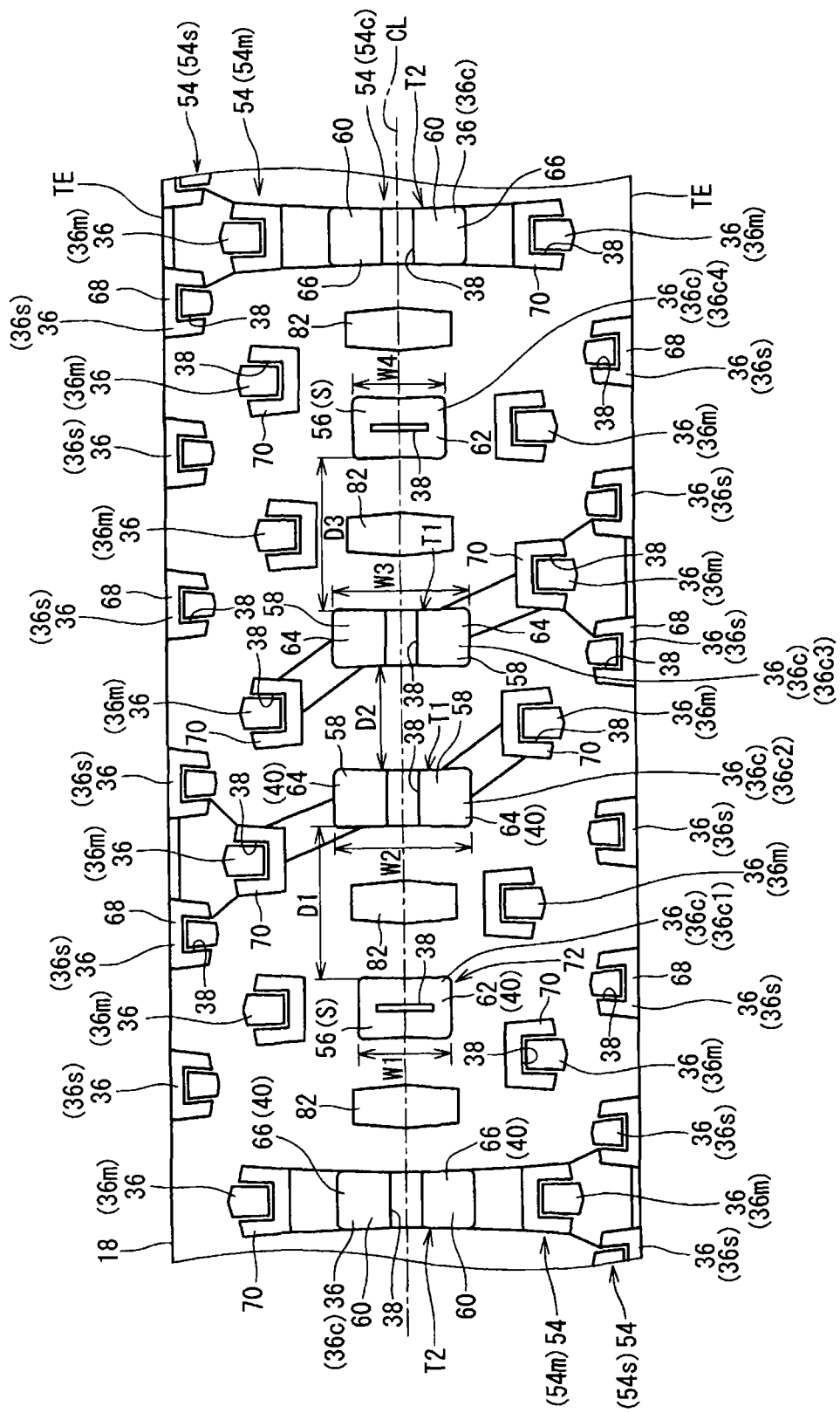
FIG. 3 illustrates a developed view in which a portion of the block pattern of FIG. 2 is illustrated.

FIG. 3 illustrates a portion of the block pattern illustrated in FIG. 2. In FIG. 3, a left-right direction is the circumferential direction and an up-down direction is the axial direction.

In the tire 16, the large number of the blocks 36 that are provided in the tread 18 include multiple block groups 54. Among the block groups 54, a block group (54c) positioned on the plane of the equator is referred to as a center block group. A block group (54s) positioned on an edge (TE) of the tread surface 28 is referred to as a shoulder block group. A block group (54m) positioned between the center block group (54c) and the shoulder block group (54s) is referred to as a middle block group.

The center block group (54c) includes a large number of center blocks (36c) that are arranged on the plane of the equator at intervals in the circumferential direction. The center block group (54c) includes, as center blocks (36c), single blocks (S) that are each formed from one big block 56, small twin blocks (T1) that are each formed from two small blocks 58 that are parallel-aligned in the axial direction, and medium twin blocks (T2) that are each formed from two medium blocks 60 that are parallel-aligned in the axial direction. As illustrated in FIGS. 2 and 3, a groove 38 extending in the axial direction is engraved on a surface 62 of the big block 56. In the small twin block (T1), the two small blocks 58 are separated by a groove 38 that extends in the circumferential direction. A groove 38 is not engraved on a surface 64 of each of the small blocks 58. In the medium twin block (T2), the two medium blocks 60 are separated by a groove 38 that extends in the circumferential direction. A groove 38 is not engraved on a surface 66 of each of the medium blocks 60.

In the tire 16, an area of the surface 62 of the big block 56 is larger than an area of the surface 64 of the small block 58. An area of the surface 66 of the medium block 60 is smaller than the area of the surface 62 of the big block 56 and is larger than the area of the surface 64 of the small block 58. In the present specification, an area of the surface 40 of each of the blocks 36 is represented by an area of an imaginary surface that is obtained by assuming that there is not a groove 38 when the groove 38 is engraved on the surface 40 of the block 36.

The shoulder block group (54s) includes a large number of shoulder blocks (36s) that are arranged on the edge (TE) of the tread surface 28 at intervals in the circumferential direction. As illustrated in FIGS. 2 and 3, a groove 38 is engraved on a surface 68 of each of the shoulder blocks (36s). Size, shape and arrangement of the shoulder block (36s) are appropriately determined according to specifications of the tire 16.

The middle block group (54m) includes a large number of middle blocks (36m) that are arranged between the center block group (54c) and the shoulder block group (54s) at intervals in the circumferential direction. As illustrated in FIGS. 2 and 3, a groove 38 is engraved on a surface 70 of each of the middle blocks (36m). Size, shape and arrangement of the middle block (36m) are appropriately determined according to the specifications of the tire 16.

As illustrated in FIG. 2, in the tire 16, the center block group (54c) includes multiple units 72, each of which includes a first center block (36c1), a second center block (36c2), a third center block (36c3) and a fourth center block (36c4). These units 72 are arranged along the equator at equal intervals in the circumferential direction. Between one unit 72 and another unit 72 positioned next to the one unit 72, a medium twin block (T2) is arranged.

In each of the units 72, the first center block (36c1), the second center block (36c2), the third center block (36c3) and the fourth center block (36c4) are arranged in this order in the circumferential direction. In the block pattern illustrated in FIGS. 2 and 3, the first center block (36c1), the second center block (36c2), the third center block (36c3) and the fourth center block (36c4) are arranged from a left side (front side) to a right side (rear side) in an order of the first center block (36c1), the second center block (36c2), the third center block (36c3) and the fourth center block (36c4).

In the tire 16, the first center block (36c1) is a big block 56. In other words, the first center block (36c1) is structured by a single block (S) that is formed from one big block 56. The second center block (36c2) is a small twin block (T1). In other words, the second center block (36c2) is structured by a small twin block (T1) that is formed from two small blocks 58 that are parallel-aligned in the axial direction. The third center block (36c3) is a small twin block (T1). In other words, the third center block (36c3) is structured by a small twin block (T1) that is formed from two small blocks 58 that are parallel-aligned in the axial direction. The fourth center block (36c4) is a big block 56. In other words, the fourth center block (36c4) is structured by a single block (S) that is formed from one big block 56. In the unit 72, the two single blocks (S) and the two small twin blocks (T1) are arranged in an order of the single block (S), the small twin block (T1), the small twin block (T1) and the single block (S) at intervals in the circumferential direction.

In FIG. 3, a double-headed arrow (D1) represents an interval from the first center block (36c1) to the second center block (36c2). A double-headed arrow (D2) represents an interval from the second center block (36c2) to the third center block (36c3). A double-headed arrow (D3) represents an interval from the third center block (36c3) to the fourth center block (36c4). A double-headed arrow (W1) represents a width of the first center block (36c1). A double-headed arrow (W2) represents a width of the second center block (36c2). A double-headed arrow (W3) represents a width of the third center block (36c3). A double-headed arrow (W4) represents a width of the fourth center block (36c4). The interval (D1), the interval (D2) and the interval (D3) represent lengths measured along the equator in the developed view. The width (W1), the width (W2), the width (W3) and the width (W4) represent maximum widths in the axial direction measured in the developed view.

In the tire 16, the interval (D1) is larger than the interval (D2). In other words, the first center block (36c1) and the second center block (36c2) are sparsely arranged. In the tire 16, a large force is applied to the second center block (36c2) that comes into contact with a road surface after the first center block (36c1). This force contributes to a force with which the second center block (36c2) scratches the road surface. From this viewpoint, it is preferable that a ratio of the interval (D1) to the interval (D2) is 1.2 or more and 1.8 or less.

In the tire 16, the area of the surface 64 of the small block 58 that forms a part of the second center block (36c2) is smaller than the area of the surface 62 of the big block 56 that forms the first center block (36c1). However, in the tire 16, an edge of the second center block (36c2) in the axial direction is positioned on an outer side than an edge of the first center block (36c1). In other words, the width (W2) of the second center block (36c2) is larger than the width (W1) of the first center block (36c1). Therefore, despite that the second center block (36c2) is structured by the twin block (T1) that is formed from two small blocks 58 that are parallel-aligned in the axial direction, the force with which the second center block (36c2) scratches the road surface is large. From this viewpoint, it is preferable that a ratio of the width (W2) to the width (W1) is 1.2 or more and 1.8 or less.

In the tire 16, the interval (D3) is larger than the interval (D2). In other words, the third center block (36c3) and the fourth center block (36c4) are sparsely arranged. In the tire 16, a large force is applied to the fourth center block (36c4) that comes into contact with the road surface after the third center block (36c3). This force contributes to a force with which the fourth center block (36c4) scratches the road surface. Further, the fourth center block (36c4) is structured by the single block (S) that is formed from one big block 56, and the area of the surface 62 of the big block 56 is larger than the area of the surface 64 of the small block 58. The fourth center block (36c4) has high rigidity and thus is unlikely to be twisted even when a force is applied. Therefore, the force with which the fourth center block (36c4) scratches the road surface is large. From this viewpoint, it is preferable that a ratio of the interval (D3) to the interval (D2) is 1.2 or more and 1.8 or less.

As described above, in the tire 16, the area of the surface 64 of the small block 58 that forms a part of the second center block (36c2) is smaller than the area of the surface 62 of the big block 56. The area of the surface 64 of the small block 58 that forms a part of the third center block (36c3) is also smaller than the area of the surface 62 of the big block 56. Therefore, a large load is applied to each of the small blocks 58. However, in the tire 16, the interval (D2) is smaller than the interval (D1). In other words, the second center block (36c2) and the third center block (36c3) are densely arranged. Therefore, a time period from when the second center block (36c2) comes into contact with the road surface to when the third center block (36c3) comes into contact with the road surface is short. Since the time period during which a large load is applied to the small block 58 is short, the small block 58 is unlikely to be chipped. The tire 16 is excellent in chipping resistance of the blocks 36. The dense arrangement of the blocks 36 affects ground-contact feeling. However, since the second center block (36c2) and the third center block (36c3) are each structured by a twin block (T1) that is formed from two small blocks 58 that are parallel-aligned in the axial direction, the ground-contact feeling can be properly maintained.

In the tire 16, depending on an orientation of the tire 16 when mounted on a vehicle body, the fourth center block (36c4), the third center block (36c3), the second center block (36c2) and the first center block (36c1) come into contact with the road surface in this order. Also in this case, the interval (D3) is larger than the interval (D2) and thus, a large force is applied to the third center block (36c3) that comes into contact with the road surface after the fourth center block (36c4). This force contributes to a force with which the second center block (36c2) scratches the road surface. From this viewpoint, as described above, it is preferable that the ratio of the interval (D3) to the interval (D2) is 1.2 or more and 1.8 or less. The width (W3) of the third center block (36c3) is larger than the width (W4) of the fourth center block (36c4) and thus, despite that the third center block (36c3) is structured by the twin block (T1) that is formed from two small blocks 58 that are parallel-aligned in the axial direction, the force with which the third center block (36c3) scratches the road surface is large. From this viewpoint, it is preferable that a ratio of the width (W3) to the width (W4) is 1.2 or more and 1.8 or less. The interval (D1) is larger than the interval (D2) and thus, a large force is applied to the first center block (36c1) that comes into contact with the road surface after the second center block (36c2). This force can contribute to a force with which the first center block (36c1) scratches the road surface. Further, as described above, the first center block (36c1) is structured by the single block (S) that is formed from one big block 56, and the area of the surface 62 of the big block 56 is larger than the area of the surface 64 of the small block 58. The first center block (36c1) has high rigidity and thus is unlikely to be twisted even when a force is applied. Therefore, the force with which the first center block (36c1) scratches the road surface is large. From this viewpoint, as described above, it is preferable that the ratio of the interval (D1) to the interval (D2) is 1.2 or more and 1.8 or less. Further, the second center block (36c2) and the third center block (36c3) are densely arranged. Therefore, a time period from when the third center block (36c3) comes into contact with the road surface to when the second center block (36c2) comes into contact with the road surface is short. Since the time period during which a large load is applied to the small block 58 is short, the small block 58 is unlikely to be chipped. The tire 16 is excellent in chipping resistance of the blocks 36. The dense arrangement of the blocks 36 affects ground-contact feeling. However, since the second center block (36c2) and the third center block (36c3) are each structured by a twin block (T1) that is formed from two small blocks 58 that are parallel-aligned in the axial direction, the ground-contact feeling can be properly maintained.

In this way, in the tire 16, the force scratching the road surface is large and ground-contact feeling is properly maintained, and thus, improvement in traction is achieved. According to an embodiment of the present invention, the off-road pneumatic tire 16 is obtained for which improvement in the traction performance is achieved.

In the tire 16, it is preferable that the interval (D1) is 2.5% or more of a length of the equator of the tire 16. In other words, it is preferable that a ratio (R1) of the interval (D1) to the length of the equator is 2.5% or more. As a result, the first center block (36c1) and the second center block (36c2) are sparsely arranged. The sparse arrangement can contribute to the force with which the second center block (36c2) scratches the road surface in the case where the first center block (36c1) comes into contact with the road surface before the second center block (36c2), and can contribute to the force with which the first center block (36c1) scratches the road surface in the case where the second center block (36c2) comes into contact with the road surface before the first center block (36c1). From this viewpoint, it is preferable that the ratio (R1) is 2.6% or more. From a viewpoint of riding comfort, it is preferable that the ratio (R1) is 3.0% or less. The length of the equator represents a length of a circumference that is obtained based on an outer diameter of the tire 16.

In the tire 16, it is preferable that the interval (D2) is 2.0% or less of the length of the equator. In other words, it is preferable that a ratio (R2) of the interval (D2) to the length of the equator is 2.0% or less. As a result, the second center block (36c2) and the third center block (36c3) are densely arranged. The dense arrangement can contribute to shortening of the time period from when the second center block (36c2) comes into contact with the road surface to when the third center block (36c3) comes into contact with the road surface in the case where the second center block (36c2) comes into contact with the road surface before the third center block (36c3), and can contribute to shortening of the time period from when the third center block (36c3) comes into contact with the road surface to when the second center block (36c2) comes into contact with the road surface in the case where the third center block (36c3) comes into contact with the road surface before the second center block (36c2). In the tire 16, the small block 58 that forms a part of the second center block (36c2) and the small block 58 that forms a part of the third center block (36c3) are unlikely to be chipped. The tire 16 is excellent in chipping resistance of the blocks 36. From a viewpoint that ground-contact feeling is properly maintained, it is preferable that the ratio (R2) is 1.6% or more.

In the tire 16, it is preferable that the interval (D3) is 2.5% or more of the length of the equator. In other words, it is preferable that a ratio (R3) of the interval (D3) to the length of the equator is 2.5% or more. As a result, the third center block (36c3) and the fourth center block (36c4) are sparsely arranged. The sparse arrangement can contribute to the force with which the fourth center block (36c4) scratches the road surface in the case where the third center block (36c3) comes into contact with the road surface before the fourth center block (36c4), and can contribute to the force with which the third center block (36c3) scratches the road surface in the case where the fourth center block (36c4) comes into contact with the road surface before the third center block (36c3). From this viewpoint, it is preferable that the ratio (R3) is 2.6% or more. From a viewpoint of riding comfort, it is preferable that the ratio (R3) is 3.0% or less.

In the tire 16, it is preferable that a ratio of an area (Ab) of the surface 62 of the big block 56 to an area (As) of the surface 64 of the small block 58 is 1.5 or more and 2.5 or less. As a result, the first center block (36c1) and the fourth center block (36c4), which are each structured by one big block 56, as well as the second center block (36c2) and the third center block (36c3), which are each structured by two small blocks 58, respectively, can effectively contribute to the traction performance of the tire 16 without impairing the ground-contact feeling and the chipping resistance.

From a viewpoint that the big block 56 can contribute to the traction performance without impairing the ground-contact feeling and the chipping resistance, it is preferable that a ratio of the area (Ab) of the surface 62 of the big block 56 to an area of the tread surface 28 is 0.17% or more and 0.25% or less. In the present application, the area of the tread surface 28 is represented by a product of a developed width (WA) (to be described later) of the tread surface 28 and the above-described length of the equator.

From a viewpoint that the small block 58 can contribute to the traction performance without impairing the ground-contact feeling and the chipping resistance, it is preferable that a ratio of the area (As) of the surface 64 of the small block 58 to the area of the tread surface 28 is 0.11% or more and 0.14% or less.

In the tire 16, the tread 18 further has main tie bars 74, in addition to the body 34 and the blocks 36. The main tie bars 74 project from the body 34 substantially outward in the radial direction. A surface 76 of the main tie bar 74 is positioned on a more inner side than the surface 40 of the block 36. In other words, the main tie bar (74) portion is recessed from the tread surface 28. The main tie bar 74 has a height ranging from 2.0 mm to 4.0 mm.

As illustrated in FIG. 2, between the small twin block (T1) that forms the second center block (36c2) and a middle block (36m) that is positioned on an outer side of the small twin block (T1) in the axial direction, a main tie bar 74 is positioned. Between the small twin block (T1) that forms the third center block (36c3) and a middle block (36m) that is positioned on an outer side of the small twin block (T1) in the axial direction, a main tie bar 74 is positioned. In other words, by the main tie bar 74, the small twin block (T1) and the middle block (36m) are connected. The main tie bar 74 reinforces between the small twin block (T1) and the middle block (36m). As a result, without impairing ground-contact feeling of the small block 58 that forms the small twin block (T1), improvement in rigidity of the second center block (36c2) and the third center block (36c3) is achieved. The main tie bar 74 can contribute to the traction performance of the tire 16.

In the tire 16, the tread 18 further has sub tie bars 74, in addition to the body 34, the blocks 36 and the main tie bars 74. The sub tie bars 78 project from the body 34 substantially outward in the radial direction. A surface 80 of the sub tie bar 78 is positioned on a more inner side than the surface 40 of the block 36. In other words, similar to above-described main tie bar (74) portion, the sub tie bar (78) portion also is recessed from the tread surface 28. The sub tie bar 78 has a height ranging from 2.0 mm to 4.0 mm.

As illustrated in FIG. 2, between a middle block (36m) and shoulder blocks (36s) that are positioned on an outer side of the middle block (36m) in the axial direction, a sub tie bar 78. In other words, by the sub tie bar 78, the middle block (36m) and the shoulder blocks (36s) are connected. The sub tie bar 78 reinforces between the middle block (36m) and the shoulder block (36s). As a result, rigidity of a shoulder portion of the tire 16 is effectively improved. The tire 16 is excellent in turning performance.

In the tire 16, of the two middle blocks (36m) that are connected to the twin block (T1) that forms the second center block (36c2), one middle block (36m1) is connected to the shoulder blocks (36s) by the sub tie bar 78. Between the other middle block (36m2) and the shoulder blocks (36s) that are positioned on an outer side of the other middle block (36m2) in the axial direction, a sub tie bar 78 is not provided. Also for the third center block (36c3), of the middle blocks (36m) that are connected to the twin block 8, one middle block (36m1) is connected to the shoulder blocks (36s) by the sub tie bar 78. Between the other middle block (36m2) and the shoulder blocks (36s) that are positioned on an outer side of the other middle block (36m2) in the axial direction, a sub tie bar 78 is not provided. Therefore, even when mud that forms the road surface is attached between the second center block (36c2) and the third center block (36c3), the attached mud is discharged from between the middle block (36m2) and the shoulder blocks (36s) that are not connected by a sub tie bar 78. In the tire 16, mud is unlikely to accumulate between the densely arranged second center block (36c2) and third center block (36c3). In the tire 16, deterioration in traction due to mud attachment is effectively prevented. The tire 16 is excellent in the traction performance.

In the tire 16, the body 34 has recesses 82. As illustrated in FIG. 3, a contour of a recess 82 has a substantially rectangular shape. In the tire 16, the recesses 82 are provided between the first center block (36c1) and the second center block (36c2) and between the third center block (36c3) and the fourth center block (36c4).

Figure 4:
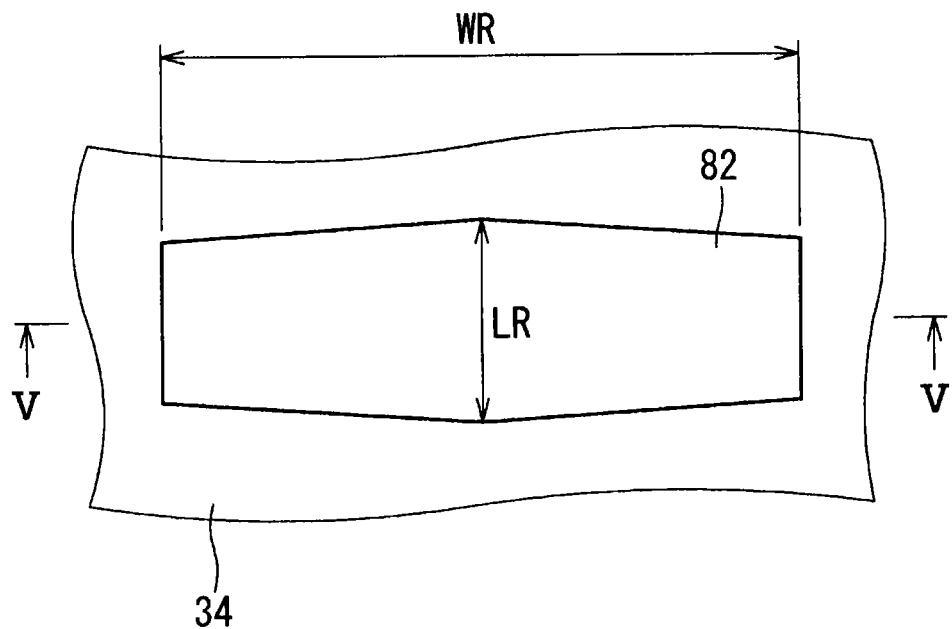
FIG. 4 illustrates a developed view in which a recess that is provided on a body of the tire of FIG. 1 is illustrated.
Figure 5:
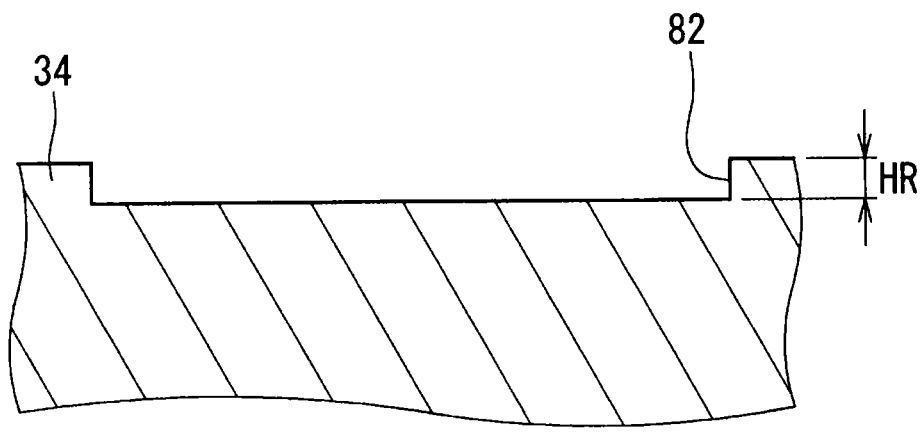
FIG. 5 illustrates a cross-sectional view along a V-V line in FIG. 4.

Illustrated in FIG. 4 is a recess 82. In FIG. 4, an up-down direction is the circumferential direction of the tire 16, and a left-right direction is the axial direction of the tire 16. FIG. 5 illustrates a cross section along a V-V line in FIG. 4.

As illustrated in FIGS. 4 and 5, the recess 82 is recessed inwardly from the surface of the body 34. The recess 82 is a depressed area. A portion of the body 34 where a recess 82 is provided has a thin thickness. The recesses 82 can contribute to deflection of the tread 18 portion. As described above, the first center block (36c1) and the second center block (36c2) are sparsely arranged. The third center block (36c3) and the fourth center block (36c4) are sparsely arranged. The recesses 82 are provided at portions where the blocks 36 are sparsely arranged. Therefore, the deflection of the sparse-arrangement portions is large. Large deflection can contribute to a large reaction force. Since a large reaction force is generated, a large force is applied to the second center block (36c2) that comes into contact with the road surface after the first center block (36c1). A large force is applied to the fourth center block (36c4) that comes into contact with the road surface after the third center block (36c3). In the tire 16, the forces with which the second center block (36c2) and the fourth center block (36c4) scratch the road surface are large. The recesses 82 can improve the traction performance of the tire 16.

In FIG. 4, a double-headed arrow WR represents a length of the recess 82 in the axial direction. A double-headed arrow LR represents a length of the recess 82 in the circumferential direction. In FIG. 5, a double-headed arrow HR represents a depth of the recess 82.

From a viewpoint that the recesses 82 can effectively contribute to the traction performance, it is preferable that a ratio of the length (WR) to the developed width (WA) (to be described later) is 35% or more and 60% or less. It is preferable that the length (LR) is 5.0 mm or more and 17 mm or less. It is preferable that the depth (HR) is 0.5 mm or more and 2.5 mm or less.

In FIG. 2, a double-headed arrow (WA) represents the developed width of the tread surface 28. The developed width (WA) is equal to a perimeter from one edge (TE) of the tread surface 28 to the other edge (TE) of the tread surface 28. Solid lines (L1, L2) are straight lines that divide the developed width (WA) into three equal portions. A region from the straight line (L1) to the straight line (L2) is referred to as a crown region (Cr). A region from one edge (TE) of the tread surface 28 to the straight line (L1) and a region from the other edge (TE) of the tread surface 28 to the straight line (L2) are referred to as shoulder regions (Sh). In the crown region (Cr), the center block group (54c) is provided. In the shoulder regions (Sh), the shoulder block groups (54s) and the middle block groups (54m) are provided.

In the tire 16, from a viewpoint that the center block group (54c) can effectively contribute to the traction performance, it is preferable that a land/sea ratio (Rc) in the crown region (Cr) is 10% or more and 25% or less.

In the tire 16, from a viewpoint that the crown region (Cr) moderately deflects during straight traveling, it is preferable that the land/sea ratio (Rc) of the crown region (Cr) is smaller than a land/sea ratio (Rs) of the shoulder regions (Sh). Specifically, it is preferable that a ratio of the land/sea ratio (Rc) to the land/sea ratio (Rs) is 0.9 or less and 0.5 or more.

In the present invention, dimensions and angles of each member of the tire 16 are measured in a state in which the tire 16 is mounted on a normal rim and air is filled in the tire 16 so that the tire 16 has a normal internal pressure. During measurement, a load is not applied to the tire 16. The normal rim in the present specification means a rim prescribed in standards on which the tire 16 is based. A "Standard Rim" in JATMA standards, a "Design Rim" in TRA standards, and a "Measuring Rim" in ETRTO standards are normal rims. The normal internal pressure in the present specification means an internal pressure prescribed in standards on which the tire 16 is based. A "Highest Air Pressure" in the JATMA standards, a "Maximum Value" published in "Tire Load Limits at Various Cold Inflation Pressures" in the TRA standards, and an "Inflation Pressure" in the ETRTO standards are normal internal pressures. The same applies to dimensions and angles of each member of the tire 16 to be described later.

Figure 6:
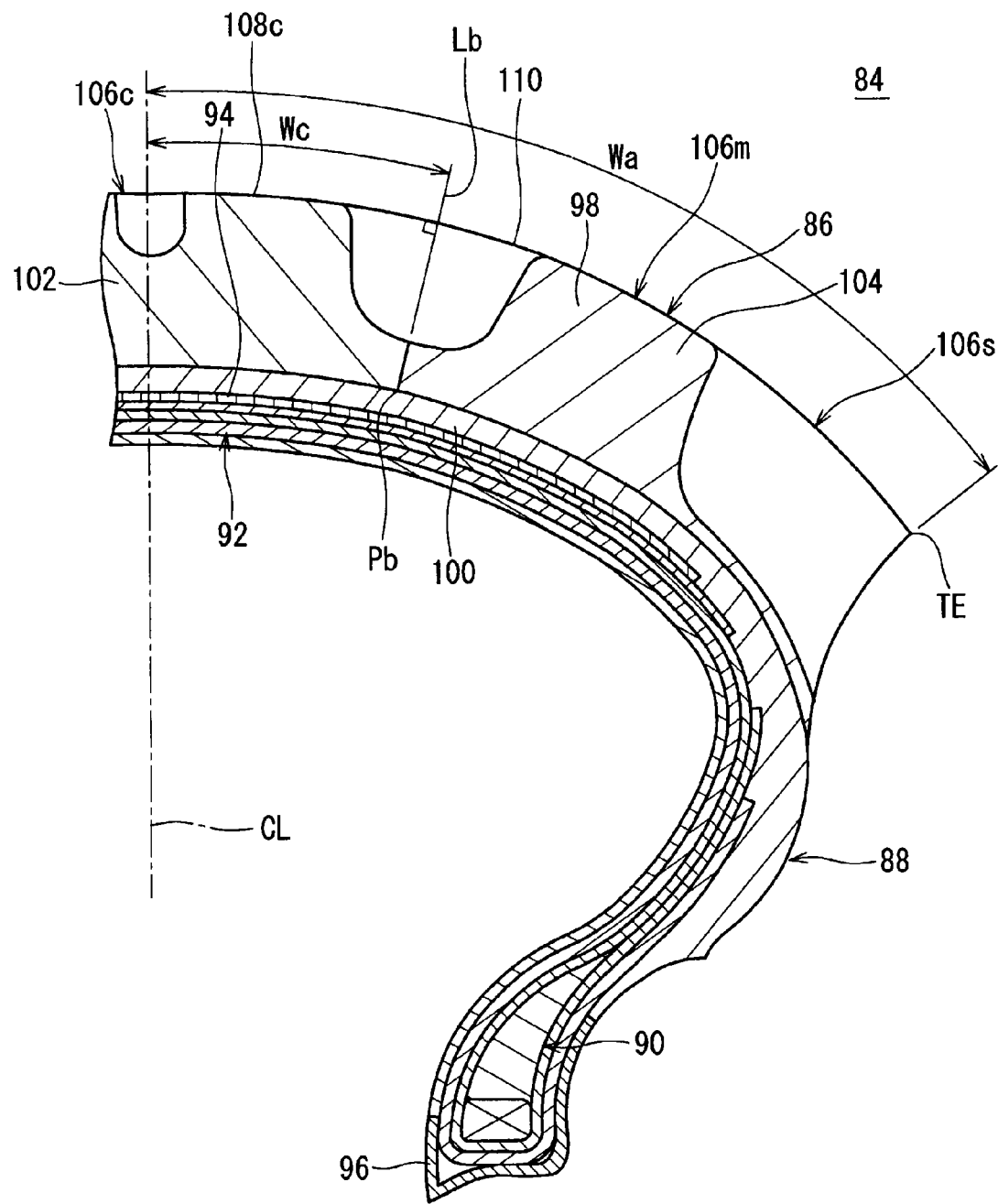
FIG. 6 illustrates a cross-sectional view in which a portion of an off-road pneumatic tire according to another embodiment of the present invention is illustrated.

FIG. 6 illustrates a cross-sectional view in which a portion of an off-road pneumatic tire 84 according to another embodiment of the present invention is illustrated. In FIG. 6, an up-down direction is a radial direction of the tire 84; a left-right direction is an axial direction of the tire 84; a direction perpendicular to a paper surface is a circumferential direction of the tire 84. In FIG. 6, a one-dotted chain line CL represents a plane of an equator of the tire 84. The tire 84 has a shape that is symmetrical with respect to the plane of the equator except for a block pattern.

The tire 84 has a tread 86, a side wall 88, a bead 90, a carcass 92, a belt 94 and a chafer 96. The tire 84 is of a tube type.

Similar to the tire 16 illustrated in FIG. 1, the tread 86 of the tire 84 has a cap layer 98 and a base layer 100. The cap layer 98 has a center part 102 and a pair of side parts 104. Except that the cap layer 98 is structured by the center part 102 and a pair of the side parts 104, the tire 84 has a structure equivalent to that of the tire 16 illustrated in FIG. 1. Therefore, the block pattern of the tire 84 is equivalent to the block pattern of the tire 16 illustrated in FIG. 1.

As described above, the cap layer 98 has the center part 102 and the pair of the side parts 104. Each of the side parts 104 is positioned on an outer side of the center part 102 in the axial direction. The cap layer 98 is structured by the center part 102 and the pair of the side parts 104.

In the tire 84, a center block group (106c) is provided in the center part 102. A middle block group (106m) and a shoulder block group (106s) are provided in the side part 104. The middle block group (106m) may also be provided in a boundary portion between the center part 102 and the side part 104.

In the tire 84, the center part 102 is formed of a cross-linked rubber. The side parts 104 are also formed of a crosslinked rubber. In the tire 84, the side parts 104 are formed of a crosslinked rubber different from the crosslinked rubber that forms the center part 102. The center part 102 and the side parts 104 may also be formed from of the same crosslinked rubber.

In the tire 84, it is preferable that the center part 102 has a hardness (Hc) of 70 or more and 80 or less. By setting the hardness (Hc) to be 70 or more, the center block group (106c) can contribute to the traction performance. By setting the hardness (Hc) to be 80 or less, the center part 102 effectively deflects. The deflection can contribute to a force with which the center block (108c) scratches the road surface.

In the present application, the hardness (Hc) is a JIS-A hardness. The hardness (Hc) is measured using a durometer of type A in an environment of 23° C. in conformity with provisions of "JIS-K6253." More specifically, the hardness (Hc) is measured by pressing a durometer of type A against a cross section illustrated in FIG. 6. A hardness (Hs) (to be described later) of the side parts 104 is similarly measured.

In the tire 84, from a viewpoint that the side parts 104 have a moderate rigidity, it is preferable that the hardness (Hs) of the side parts 104 is 65 or more and 75 or less.

In the tire 84, it is preferable that the side parts 104 are softer than the center part 102. Specifically, it is preferable that a difference (Hc–Hs) between the hardness (Hc) of the center part 102 and the hardness (Hs) of the side part 104 is 3 or more. The soft side parts 104 can contribute to the grip performance during turning. From this viewpoint, it is preferable that the difference (Hc–Hs) is 5 or more. From a viewpoint that a difference in rigidity between the center part 102 and the side parts 104 is suppressed and a sense of discomfort during transition from straight traveling to turning or from turning to straight traveling is reduced, it is preferable that the difference (Hc–Hs) is 15 or less.

In FIG. 6, a double-headed arrow Wa represents a length from the equator to one edge (TE) of the tread surface 28. A reference numeral symbol Pb represents a reference point defining a boundary between the center part 102 and the side part 104. The reference point (Pb) is on a boundary between the cap layer 98 and the base layer 100. A solid line (Lb) is a normal line of a tread surface 110 passing through the reference point (Pb). A double-headed arrow Wc represents a length from the equator to the normal line (Lb). The length (Wa) and the length (Wc) are measured along the tread surface 110. The length (Wa) corresponds to a half of a developed width (WA) of the tread surface 110.

In the tire 84, it is preferable that a ratio of the length (Wc) to the length (Wa) is 0.25 or more and 0.35 or less. By setting this ratio to be 0.25 or more, the center part 102 can effectively contribute to the traction performance. By setting this ratio to be 0.35 or less, the side parts 104 can effectively contribute to the grip performance during turning.

EXAMPLES

In the following, effects according to an embodiment of the present invention are made clear by examples. However, the present invention should not be construed as being limited based on descriptions of the examples.

Example 1

An off-road pneumatic tire of Example 1 was obtained that has a basic configuration illustrated in FIG. 1 and has specifications illustrated in the following Table 1. The tire has a size of 120/80-19.

In Example 1, units included in a center block group are each structured by a first center block, a second center block, a third center block and a fourth center block. The first center block and the fourth center block are each structured by a single block that is formed from one big block. The second center block and the third center block are each structured by a small twin block that is formed from two small blocks that are parallel-aligned in an axial direction. In Table 1, in a field of "Configuration" for each block, "single" indicates that the block is a single block, and "twin" indicates that the block is a twin block. In a field of "Type" for each block, "big" indicates that the block is a big block, and "small" indicates that the block is a small block. In Example 1, the ratio (Ab/As) of the area Ab of the surface of the big block to the area (As) of the surface of the small block was 1.9.

In Example 1, the ratio (R1) of the interval (D1) to the length of the equator was 2.7%. The ratio (R2) of the interval (D2) to the length of the equator was 1.8%. The ratio (R3) of the interval (D3) to the length of the equator was 2.7%. The ratio (W2/W1) of the width (W2) to the width (W1) and the ratio (W3/W4) of the width (W3) to the width (W4) were 1.5.

In Example 1, the cap layer of the tread is formed from one crosslinked rubber. The hardness of the cap layer was 73.

In the cap layer of Example 1, main tie bars are provided. This is indicated by "Y" in a field of "Main Tie Bar" in Table 1. In the cap layer, sub tie bars are further provided. A sub tie bar connects one middle block among two middle blocks that are each connected to a twin block by a main tie bar, to shoulder blocks that are positioned on an outer side of the one middle block in the axial direction. This is indicated by "S" in a field of "Sub Tie Bar" in Table 1. Further, in the body of the cap layer, recesses are provided. The recesses are positioned between the first center block and the second center block and between the third center block and the second center block. This is indicated by "Y" in a field of "Recess" in Table 1.

Comparative Example 1

Comparative Example 1 is a conventional off-road pneumatic tire. On a tread surface of Comparative Example 1, the block pattern illustrated in FIG. 6 is provided.

Example 2

A tire of Example 2 was obtained in the same manner as in Example 1 except that main tie bars, sub tie bars and recesses were not provided. That main tie bars, sub tie bars and recesses are not provided is indicated in Table 1 by "N" in each of the fields of "Main Tie Bar," "Sub Tie Bar" and "Recess."

Example 3

A tire of Example 3 was obtained in the same manner as in Example 1 except that recesses were not provided.

Example 4

A tire of Example 4 was obtained in the same manner as in Example 1 except that two middle blocks that are connected to a twin block by main tie bars are each connected by a sub tie bar to shoulder blocks that are positioned on outer side of the each middle block in the axial direction and that recesses were not provided. That the two middle blocks that are connected to the twin block are each connected by the sub tie bar to the shoulder blocks that are positioned on an outer side of the each middle block in the axial direction is indicated in Table 1 by "W" in the field of "Sub Tie Bar."

Comparative Example 2

A tire of Comparative Example 2 was obtained in the same manner as in Example 1 except that the first center block, the second center block, the third center block and the fourth center block were each structured by a medium twin block that is formed from two medium blocks that are parallel-aligned in the axial direction. In Table 2, "medium" in the field of "Type" for each block indicates that the block is a medium block. An area (Am) of a surface of the medium block was adjusted so that a ratio (Am/As) of the area (Am) to the area (As) of the surface of the small block that is adopted in Example 1 is 1.1. In Comparative Example 2, main tie bars, sub tie bars and recesses are not provided.

Comparative Example 3

A tire of Comparative Example 3 was obtained in the same manner as in Example 1 except that the first center block, the second center block, the third center block and the fourth center block were each structured by a single block that is formed from one big block. The big block in Comparative Example 3 is the same as that adopted in Example 1. In Comparative Example 3, main tie bars, sub tie bars and recesses are not provided.

Comparative Example 4

A tire of Comparative Example 4 was obtained in the same manner as in Example 1 except that the first center block, the second center block, the third center block and the fourth center block were each structured by a small twin block that is formed from two small blocks that are parallel-aligned in the axial direction. The small twin block in Comparative Example 4 is the same as that adopted in Example 1. In Comparative Example 4, main tie bars, sub tie bars and recesses are not provided.

Comparative Examples 5-6

Tires of Comparative Examples 5 and 6 were obtained in the same manner as in Example 1 except that main tie bars, sub tie bars and recesses were not provided and the ratio (R1), the ratio (R2) and the ratio (R3) were set as in the following Table 2.

Comparative Example 7

A tire of Comparative Example 7 was obtained in the same manner as in Example 1 except that main tie bars, sub tie bars and recesses were not provided; the first center block and the fourth center block were each structured by a small twin block that is formed from two small blocks that are parallel-aligned in the axial direction; and the second center block and the third center block were each structured by a single block that is formed from one big block.

Examples 5-8

Tires of Examples 5-8 were obtained in the same manner as in Example 1 except that the ratio (R2) was set as in the following Table 3.

Examples 9-12

Tires of Examples 9-12 were obtained in the same manner as in Example 1 except that the ratio (R1) and the ratio (R3) were set as in the following Table 4.

Examples 13-16

Tires of Examples 13-16 were obtained in the same manner as in Example 1 except that the ratio (Ab/As) was set as in the following Table 5.

Examples 17-27

Tires of Examples 17-27 were obtained in the same manner as in Example 1 except that a base layer of a tread was structured by a center part and a pair of side parts, the hardness (Hc) of the center part and the hardness (Hs) of the side parts were set as in the following Tables 6 and 7.

Traction Performance

Each prototype tire was mounted on a rear wheel (rim size: WM2.15) of a two-wheeled vehicle (four-stroke) for motocross competition that has a displacement of 450 cc, and was filled with air so that an internal pressure of the tire was 80 kPa. A commercial tire (size: 90/100-21) was mounted on a front wheel (rim size: WM1.60), and was filled with air so that an internal pressure of the tire was 80 kPa. The two-wheeled vehicle was caused to travel on a motocross course (including sandy road surfaces and muddy road surfaces) and the traction performance was evaluated by a motocross rider. The results are presented in the following Tables 1-7 as index values with a value of Comparative Example 1 being 100. A larger index value indicates a better traction performance.

Chipping Resistance

External appearance of the tire after the evaluation was observed; and presence or absence of chipping of the blocks, sizes of the chips and the number of the chips were evaluated. The results are presented in the following Tables 1-7 as index values with a value of Comparative Example 1 being 100. A larger index value indicates a better chipping resistance.

Overall Performance

The index value that represents the traction performance and the index value that represents the chipping resistance were summed, and the overall performance was evaluated based on the sum. A larger value of the sum indicates a better overall performance.

TABLE 1

Table 1: Evaluation Results

| | | Comparative Example 1 | Example 1 | Example 2 | Example 3 | Example 4 |
|---|---|---|---|---|---|---|
| 1st Block | Configuration | — | single | single | single | single |
| | Type | — | big | big | big | big |
| 2nd Block | Configuration | — | twin | twin | twin | twin |
| | Type | — | small | small | small | small |
| 3rd Block | Configuration | — | twin | twin | twin | twin |
| | Type | — | small | small | small | small |
| 4th Block | Configuration | — | single | single | single | single |
| | Type | — | big | big | big | big |
| Ratio R1 [%] | | — | 2.7 | 2.7 | 2.7 | 2.7 |
| Ratio R2 [%] | | — | 1.8 | 1.8 | 1.8 | 1.8 |
| Ratio R3 [%] | | — | 2.7 | 2.7 | 2.7 | 2.7 |
| Ratio (W2/W1) [—] | | — | 1.5 | 1.5 | 1.5 | 1.5 |
| Ratio (W3/W4) [—] | | — | 1.5 | 1.5 | 1.5 | 1.5 |
| Ratio (Ab/As) [—] | | — | 1.9 | 1.9 | 1.9 | 1.9 |
| Main Tie Bar | | — | Y | N | Y | Y |
| Sub Tie Bar | | — | S | N | S | W |
| Recess | | — | Y | N | N | N |
| Traction | | 100 | 120 | 110 | 115 | 95 |
| Chipping | | 100 | 100 | 100 | 100 | 100 |
| Overall | | 200 | 220 | 210 | 215 | 195 |

TABLE 2

Table 2: Evaluation Results

| | | Comparative Example 2 | Comparative Example 3 | Comparative Example 4 | Comparative Example 5 | Comparative Example 6 | Comparative Example 7 |
|---|---|---|---|---|---|---|---|
| 1st Block | Configuration | twin | single | twin | single | single | twin |
| | Type | medium | big | small | big | big | small |
| 2nd Block | Configuration | twin | single | twin | twin | twin | single |
| | Type | medium | big | small | small | small | big |
| 3rd Block | Configuration | twin | single | twin | twin | twin | single |
| | Type | medium | big | small | small | small | big |
| 4th Block | Configuration | twin | single | twin | single | single | twin |
| | Type | medium | big | small | big | big | small |
| Ratio R1 [%] | | 2.7 | 2.7 | 2.7 | 2.3 | 1.8 | 2.7 |
| Ratio R2 [%] | | 1.8 | 1.8 | 1.8 | 2.3 | 2.7 | 1.8 |
| Ratio R3 [%] | | 2.7 | 2.7 | 2.7 | 2.3 | 1.8 | 2.7 |
| Ratio (W2/W1) [—] | | 1.0 | 1.0 | 1.0 | 1.5 | 1.5 | 0.67 |
| Ratio (W3/W4) [—] | | 1.0 | 1.0 | 1.0 | 1.5 | 1.5 | 0.67 |
| Main Tie Bar | | N | N | N | N | N | N |
| Sub Tie Bar | | N | N | N | N | N | N |

TABLE 2-continued

Table 2: Evaluation Results

|  | Comparative Example 2 | Comparative Example 3 | Comparative Example 4 | Comparative Example 5 | Comparative Example 6 | Comparative Example 7 |
|---|---|---|---|---|---|---|
| Recess | N | N | N | N | N | N |
| Traction | 90 | 90 | 80 | 80 | 60 | 60 |
| Chipping | 50 | 105 | 80 | 80 | 50 | 50 |
| Overall | 140 | 195 | 160 | 160 | 110 | 110 |

TABLE 3

Table 3: Evaluation Results

|  |  | Example 5 | Example 6 | Example 7 | Example 8 |
|---|---|---|---|---|---|
| 1st Block | Configuration | single | single | single | single |
|  | Type | big | big | big | big |
| 2nd Block | Configuration | twin | twin | twin | twin |
|  | Type | small | small | small | small |
| 3rd Block | Configuration | twin | twin | twin | twin |
|  | Type | small | small | small | small |
| 4th Block | Configuration | single | single | single | single |
|  | Type | big | big | big | big |
| Ratio R1 [%] |  | 2.7 | 2.7 | 2.7 | 2.7 |
| Ratio R2 [%] |  | 1.4 | 1.6 | 2.0 | 2.2 |
| Ratio R3 [%] |  | 2.7 | 2.7 | 2.7 | 2.7 |
| Ratio (W2/W1) [—] |  | 1.5 | 1.5 | 1.5 | 1.5 |
| Ratio (W3/W4) [—] |  | 1.5 | 1.5 | 1.5 | 1.5 |
| Main Tie Bar |  | Y | Y | Y | Y |
| Sub Tie Bar |  | S | S | S | S |
| Recess |  | Y | Y | Y | Y |
| Traction |  | 100 | 110 | 110 | 105 |
| Chipping |  | 105 | 105 | 100 | 95 |
| Overall |  | 205 | 215 | 215 | 200 |

TABLE 4

Table 4: Evaluation Results

|  |  | Example 9 | Example 10 | Example 11 | Example 12 |
|---|---|---|---|---|---|
| 1st Block | Configuration | single | single | single | single |
|  | Type | big | big | big | big |
| 2nd Block | Configuration | twin | twin | twin | twin |
|  | Type | small | small | small | small |
| 3rd Block | Configuration | twin | twin | twin | twin |
|  | Type | small | small | small | small |
| 4th Block | Configuration | single | single | single | single |
|  | Type | big | big | big | big |
| Ratio R1 [%] |  | 2.3 | 2.5 | 3.0 | 3.2 |
| Ratio R2 [%] |  | 1.8 | 1.8 | 1.8 | 1.8 |
| Ratio R3 [%] |  | 2.3 | 2.5 | 3.0 | 3.2 |
| Ratio (W2/W1) [—] |  | 1.5 | 1.5 | 1.5 | 1.5 |
| Ratio (W3/W4) [—] |  | 1.5 | 1.5 | 1.5 | 1.5 |
| Main Tie Bar |  | Y | Y | Y | Y |
| Sub Tie Bar |  | S | S | S | S |
| Recess |  | Y | Y | Y | Y |
| Traction |  | 100 | 110 | 115 | 115 |
| Chipping |  | 105 | 105 | 100 | 90 |
| Overall |  | 205 | 215 | 215 | 205 |

TABLE 5

Table 5: Evaluation Results

|  |  | Example 13 | Example 14 | Example 15 | Example 16 |
|---|---|---|---|---|---|
| 1st Block | Configuration | single | single | single | single |
|  | Type | big | big | big | big |
| 2nd Block | Configuration | twin | twin | twin | twin |
|  | Type | small | small | small | small |
| 3rd Block | Configuration | twin | twin | twin | twin |
|  | Type | small | small | small | small |
| 4th Block | Configuration | single | single | single | single |
|  | Type | big | big | big | big |
| Ratio R1 [%] |  | 2.7 | 2.7 | 2.7 | 2.7 |
| Ratio R2 [%] |  | 1.8 | 1.8 | 1.8 | 1.8 |
| Ratio R3 [%] |  | 2.7 | 2.7 | 2.7 | 2.7 |
| Ratio (W2/W1) [—] |  | 1.5 | 1.5 | 1.5 | 1.5 |
| Ratio (W3/W4) [—] |  | 1.5 | 1.5 | 1.5 | 1.5 |
| Ratio (Ab/As) [—] |  | 1.3 | 1.5 | 2.5 | 3.0 |
| Main Tie Bar |  | Y | Y | Y | Y |
| Sub Tie Bar |  | S | S | S | S |
| Recess |  | Y | Y | Y | Y |
| Traction |  | 100 | 115 | 120 | 110 |
| Chipping |  | 100 | 100 | 95 | 90 |
| Overall |  | 200 | 215 | 215 | 200 |

TABLE 6

Table 6: Evaluation Results

|  |  | Example 17 | Example 18 | Example 19 | Example 20 | Example 21 | Example 22 |
|---|---|---|---|---|---|---|---|
| 1st Block | Configuration | single | single | single | single | single | single |
|  | Type | big | big | big | big | big | big |
| 2nd Block | Configuration | twin | twin | twin | twin | twin | twin |
|  | Type | small | small | small | small | small | small |
| 3rd Block | Configuration | twin | twin | twin | twin | twin | twin |
|  | Type | small | small | small | small | small | small |
| 4th Block | Configuration | single | single | single | single | single | single |
|  | Type | big | big | big | big | big | big |
| Ratio R1 [%] |  | 2.7 | 2.7 | 2.7 | 2.7 | 2.7 | 2.7 |
| Ratio R2 [%] |  | 1.8 | 1.8 | 1.8 | 1.8 | 1.8 | 1.8 |

TABLE 6-continued

Table 6: Evaluation Results

|  | Example 17 | Example 18 | Example 19 | Example 20 | Example 21 | Example 22 |
|---|---|---|---|---|---|---|
| Ratio R3 [%] | 2.7 | 2.7 | 2.7 | 2.7 | 2.7 | 2.7 |
| Ratio (W2/W1) [—] | 1.5 | 1.5 | 1.5 | 1.5 | 1.5 | 1.5 |
| Ratio (W3/W4) [—] | 1.5 | 1.5 | 1.5 | 1.5 | 1.5 | 1.5 |
| Main Tie Bar | Y | Y | Y | Y | Y | Y |
| Sub Tie Bar | S | S | S | S | S | S |
| Recess | Y | Y | Y | Y | Y | Y |
| Hardness Hc | 65 | 70 | 73 | 78 | 80 | 82 |
| Hardness Hs | 68 | 68 | 68 | 68 | 68 | 68 |
| Traction | 105 | 110 | 120 | 120 | 115 | 110 |
| Chipping | 95 | 100 | 100 | 100 | 100 | 90 |
| Overall | 200 | 210 | 220 | 220 | 215 | 200 |

TABLE 7

Table 7: Evaluation Results

|  |  | Example 23 | Example 24 | Example 25 | Example 26 | Example 27 |
|---|---|---|---|---|---|---|
| 1st Block | Configuration | single | single | single | single | single |
|  | Type | big | big | big | big | big |
| 2nd Block | Configuration | twin | twin | twin | twin | twin |
|  | Type | small | small | small | small | small |
| 3rd Block | Configuration | twin | twin | twin | twin | twin |
|  | Type | small | small | small | small | small |
| 4th Block | Configuration | single | single | single | single | single |
|  | Type | big | big | big | big | big |
| Ratio R1 [%] |  | 2.7 | 2.7 | 2.7 | 2.7 | 2.7 |
| Ratio R2 [%] |  | 1.8 | 1.8 | 1.8 | 1.8 | 1.8 |
| Ratio R3 [%] |  | 2.7 | 2.7 | 2.7 | 2.7 | 2.7 |
| Ratio (W2/W1) [—] |  | 1.5 | 1.5 | 1.5 | 1.5 | 1.5 |
| Ratio (W3/W4) [—] |  | 1.5 | 1.5 | 1.5 | 1.5 | 1.5 |
| Main Tie Bar |  | Y | Y | Y | Y | Y |
| Sub Tie Bar |  | S | S | S | S | S |
| Recess |  | Y | Y | Y | Y | Y |
| Hardness Hc |  | 73 | 73 | 73 | 73 | 73 |
| Hardness Hs |  | 57 | 65 | 75 | 77 | 80 |
| Traction |  | 95 | 120 | 120 | 105 | 105 |
| Chipping |  | 105 | 100 | 100 | 100 | 95 |
| Overall |  | 200 | 220 | 220 | 205 | 200 |

As indicated in Tables 1-7, the tires of the examples are more highly evaluated than the tires of the comparative examples. From the results of the evaluation, advantages according to an embodiment of the present invention are clear. In Example 4, traction was good at start of traveling. However, traction in Example 4 deteriorated along with passage of traveling time.

The tire described above can also be applied to various off-road motorcycles.

Figure 7:
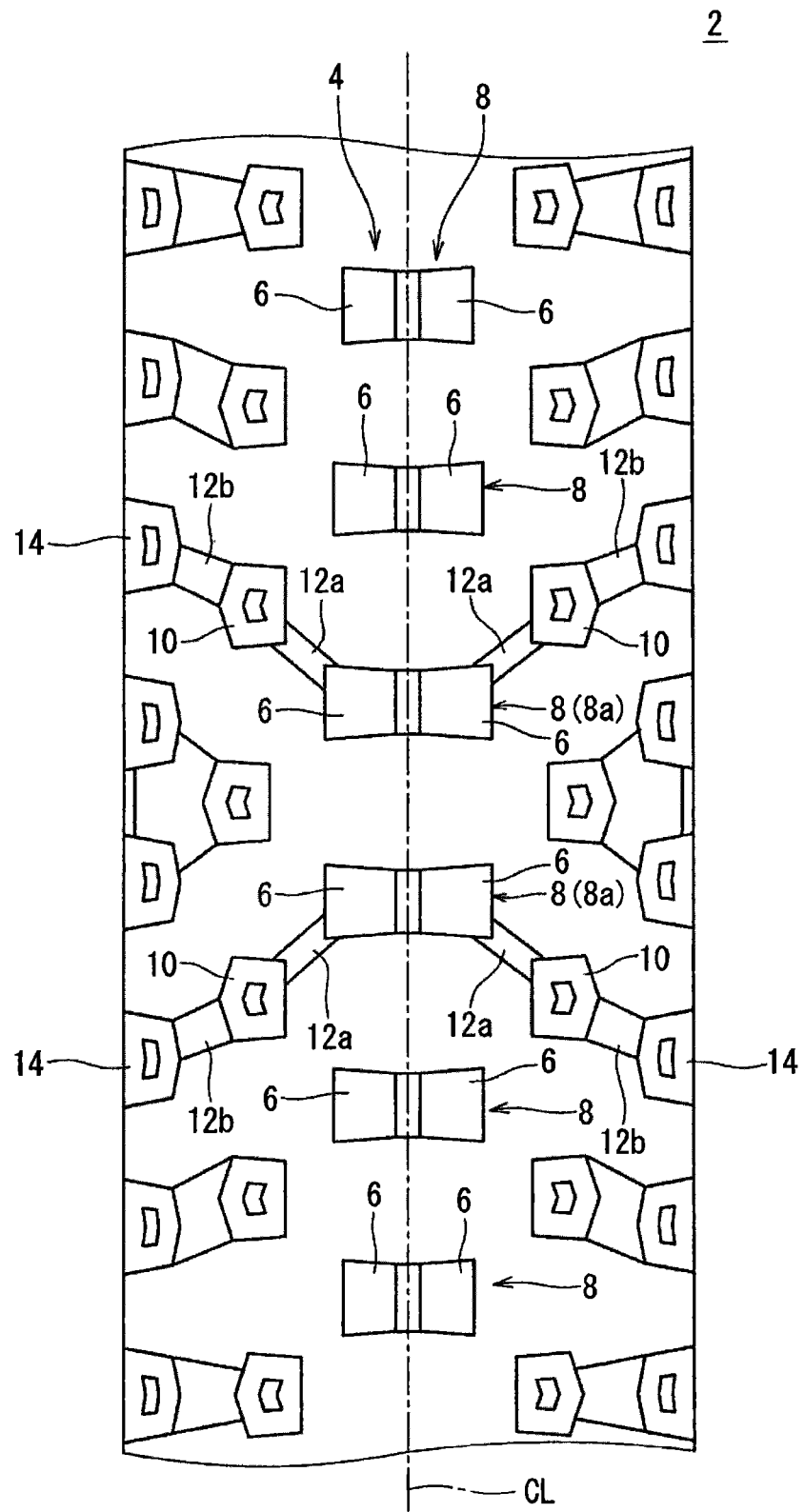
FIG. 7 illustrates a developed view in which a block pattern of a conventional off-road pneumatic tire is illustrated.

FIG. 7 illustrates a portion of a block pattern of a conventional tire 2. In FIG. 7, a one-dotted chain line (CL) represents a plane of an equator of the tire 2. A center block group 4 on the equator includes twin blocks 8 each of which is formed from two blocks 6 that are parallel-aligned in an axial direction. Twin blocks (8a), which are positioned at a center of FIG. 7, are each connected to middle blocks 10 that are positioned on both sides thereof in the axial direction by tie bars (12a). A middle block 10 that is connected by a tie bar (12a) is further connected to a shoulder block 14 that is positioned on an outer side thereof in the axial direction by another tie bar (12b).

A surface of the block 6 is in contact with a road surface. An edge of the block 6 scratches the road surface.

During straight traveling, mainly, the twin blocks 8 that are included in the center block group 4 come into contact with the road surface. The twin blocks 8 contribute to the traction performance during straight traveling.

On a soft dirt road surface, the twin block 8 is likely to sink into the road surface. Therefore, from a viewpoint of the traction performance, an interval between one twin block 8 and another twin block 8 that is positioned behind the one twin block 8 is set to be wide.

On a hard dirt road surface, sinking of the twin block 8 into the road surface is suppressed. Therefore, from the viewpoint of the traction performance, an interval between one twin block 8 and another twin block 8 that is positioned behind the one twin block 8 is set to be narrow.

There is a limit in improving the traction performance by widening or narrowing the intervals of the twin blocks 8 as described above.

An off-road pneumatic tire according to an embodiment of the present invention achieves improvement in the traction performance.

An off-road pneumatic tire according to an embodiment of the present invention has a tread of which an outer surface forms a tread surface. The tread has a body and a large number of blocks that project from the body substantially outward in a radial direction. The large number of the blocks include a center block group that includes a large number of center blocks that are arranged at intervals in a circumferential direction on an equator, a pair of shoulder block groups each of which includes a large number of shoulder blocks that are arranged at intervals in the circumferential direction on an edge of the tread surface, and a pair of middle block groups each of which includes a large number of middle blocks that are arranged at intervals in the circumferential direction between the center block group and the shoulder block group. The center block group includes multiple units each of which is structured by arranging a first center block, a second center block, a third center block and a fourth center block in this order in the circumferential direction. In each of the units, an interval (D1) from the first center block to the second center block is larger than an interval (D2) from the second center block to the third center block, and the interval (D2) is smaller than an interval (D3) from the third center block to the fourth center block. A width of the second center block is larger than a width of the first center block. The first center block and the fourth center block are each structured by a single block that is formed from one big block. The second center block and the third center block are each structured by a twin block that is formed from two small blocks that are parallel-aligned in an axial direction. An area of a surface of the big block is larger than an area of a surface of the small block.

Preferably, in the off-road pneumatic tire, the interval (D1) is 2.5% or more of a length of the equator of the tire. The interval (D2) is 2.0% or less of the length of the equator. The interval (D3) is 2.5% or more of the length of the equator.

Preferably, in the off-road pneumatic tire, a ratio of the area of the surface of the big block to the area of the surface of the small block is 1.5 or more and 2.5 or less.

Preferably, in the off-road pneumatic tire, the tread further has main tie bars that project from the body substantially outward in the radial direction. By the main tie bar, the twin block and the middle block that is positioned on an outer side of the twin block in the axial direction are connected. More preferably, in the off-road pneumatic tire, the tread further has sub tie bars that project from the body substantially outward in the radial direction. In the case where the twin block and the respective middle blocks that are positioned on outer sides of the twin block in the axial direction are connected by the main tie bars, one of the two middle blocks that are connected by the main tie bars to the twin block is connected by the sub tie bar to the shoulder block that is positioned on an outer side of the middle block in the axial direction.

Preferably, in the off-road pneumatic tire, the body has recesses that are recessed inwardly in the radial direction. The recesses are positioned between the first center block and the second center block and between the third center block and the fourth center block.

In the off-road pneumatic tire according to an embodiment of the present invention, in each of the units included in the center block group, the interval (D1) is larger than the interval (D2). The first center block and the second center block are sparsely arranged. Therefore, a large force is applied to the second center block that comes into contact with a road surface after the first center block. This force contributes to a force with which the second center block scratches the road surface.

In the tire, the width of the second center block is larger than the width of the first center block. Therefore, despite that the second center block is structured by the twin block that is formed from two small blocks that are parallel-aligned in the axial direction, the force with which the second center block scratches the road surface is large.

In the tire, the interval (D3) is larger than the interval (D2). The third center block and the fourth center block are sparsely arranged. Therefore, a large force is applied to the fourth center block that comes into contact with the road surface after the third center block. This force contributes to a force with which the fourth center block scratches the road surface. Further, the fourth center block is structured by the single block that is formed from one big block, and the area of the surface of the big block is larger than the area of the surface of the small block. The fourth center block has high rigidity and thus is unlikely to be twisted even when a force is applied. Therefore, the force with which the fourth center block scratches the road surface is large.

In the tire, the area of the surface of each of the small blocks that form the second center block and the third center block is smaller than the area of the surface of the big block. Therefore, a large load is applied to each of the small blocks. However, in the tire, the interval (D2) is smaller than the interval (D1) and the interval (D3). The second center block and the third center block are densely arranged. Therefore, a time period from when the second center block comes into contact with the road surface to when the third center block comes into contact with the road surface is short. Since the time period during which a large load is applied to the small block is short, the small block is unlikely to be chipped. The dense arrangement of the blocks affects ground-contact feeling. However, since the second center block and the third center block are each structured by a twin block that is formed from two small blocks that are parallel-aligned in the axial direction, the ground-contact feeling can be properly maintained.

In the tire, the force scratching the road surface is large and ground-contact feeling is properly maintained, and thus, improvement in traction is achieved. According to an embodiment of the present invention, an off-road pneumatic tire is obtained for which improvement in the traction performance is achieved.

Obviously, numerous modifications and variations of the present invention are possible in light of the above teachings. It is therefore to be understood that within the scope of the appended claims, the invention may be practiced otherwise than as specifically described herein.

What is claimed is:

1. An off-road pneumatic tire, comprising:
a tread having an outer surface forming a tread surface, the tread including a body and a plurality of blocks projecting from the body substantially outward in a radial direction,
wherein the plurality of blocks has a center block group, a pair of shoulder block groups and a pair of middle block groups, the center block group includes a plurality of center blocks positioned at an interval in a circumferential direction on a plane of an equator, each of the shoulder block groups includes a plurality of shoulder blocks positioned at an interval in the circumferential direction on an edge of the tread surface, each of the middle block groups includes a plurality of middle blocks positioned at an interval in the circumferential direction between the center block group and one of the shoulder block groups, the center block group has a plurality of units each comprising a first center block, a second center block, a third center block and a fourth center block positioned in an order of the first, second, third and fourth center blocks in the circumferential direction, each of the units has an interval D1 from the first center block to the second center block such that the interval D1 is larger than an interval D2 from the second center block to the third center block and that the interval D2 is smaller than an interval D3 from the third center block to the fourth center block, the second center block has a width which is larger than a width of the first center block, and each of the first center block and the fourth center block comprises a single block comprising a large block and each of the second center block and the third center block comprises a twin block comprising two small blocks parallel-aligned in an axial direction such that the large big block has an area of a surface which is larger than an area of a surface of each of the small blocks.

2. The off-road pneumatic tire according to claim 1, wherein the interval D1 is 2.5% or greater of a length of the equator of the tire, the interval D2 is 2.0% or less of the length of the equator, and the interval D3 is 2.5% or greater of the length of the equator.

3. The off-road pneumatic tire according to claim 2, wherein a ratio of the area of the surface of the large block to the area of the surface of the small block is in a range of from 1.5 or greater to 2.5 or less.

4. The off-road pneumatic tire according to claim 3, wherein the tread further includes a plurality of main tie bars projecting from the body substantially outward in the radial direction, and one of the twin blocks and one of the middle blocks positioned on an outer side of the one of the twin blocks in the axial direction are connected by one of the main tie bars.

5. The off-road pneumatic tire according to claim 4, wherein the tread further includes a plurality of sub tie bars projecting from the body substantially outward in the radial direction, one of the twin blocks and the middle blocks positioned on outer sides of the one of the twin blocks in the axial direction are connected by the main tie bars, and one of the middle blocks connected by the main tie bars to the one of the twin blocks is connected by one of the sub tie bars to one of the shoulder blocks positioned on an outer side of the one of the middle blocks in the axial direction.

6. The off-road pneumatic tire according to claim 3, wherein the body includes a plurality of recess portions recessed inwardly in the radial direction, and the plurality of recess portions is positioned between the first center block and the second center block and between the third center block and the fourth center block.

7. The off-road pneumatic tire according to claim 2, wherein the tread further includes a plurality of main tie bars projecting from the body substantially outward in the radial direction, and one of the twin blocks and one of the middle blocks positioned on an outer side of the one of the twin blocks in the axial direction are connected by one of the main tie bars.

8. The off-road pneumatic tire according to claim 7, wherein the tread further includes a plurality of sub tie bars projecting from the body substantially outward in the radial direction, one of the twin blocks and the middle blocks positioned on outer sides of the one of the twin blocks in the axial direction are connected by the main tie bars, and one of the middle blocks connected by the main tie bars to the one of the twin blocks is connected by one of the sub tie bars to one of the shoulder blocks positioned on an outer side of the one of the middle blocks in the axial direction.

9. The off-road pneumatic tire according to claim 7, wherein the body includes a plurality of recess portions recessed inwardly in the radial direction, and the plurality of recess portions is positioned between the first center block and the second center block and between the third center block and the fourth center block.

10. The off-road pneumatic tire according to claim 2, wherein the body includes a plurality of recess portions recessed inwardly in the radial direction, and the plurality of recess portions is positioned between the first center block and the second center block and between the third center block and the fourth center block.

11. The off-road pneumatic tire according to claim 10, wherein the body includes a plurality of recess portions recessed inwardly in the radial direction, and the plurality of recess portions is positioned between the first center block and the second center block and between the third center block and the fourth center block.

12. The off-road pneumatic tire according to claim 1, wherein a ratio of the area of the surface of the large block to the area of the surface of the small block is in a range of from 1.5 or greater to 2.5 or less.

13. The off-road pneumatic tire according to claim 12, wherein the tread further includes a plurality of main tie bars projecting from the body substantially outward in the radial direction, and one of the twin blocks and one of the middle blocks positioned on an outer side of the one of the twin blocks in the axial direction are connected by one of the main tie bars.

14. The off-road pneumatic tire according to claim 13, wherein the tread further includes a plurality of sub tie bars projecting from the body substantially outward in the radial direction, one of the twin blocks and the middle blocks positioned on outer sides of the one of the twin blocks in the axial direction are connected by the main tie bars, and one of the middle blocks connected by the main tie bars to the one of the twin blocks is connected by one of the sub tie bars to one of the shoulder blocks positioned on an outer side of the one of the middle blocks in the axial direction.

15. The off-road pneumatic tire according to claim 12, wherein the body includes a plurality of recess portions recessed inwardly in the radial direction, and the plurality of recess portions is positioned between the first center block and the second center block and between the third center block and the fourth center block.

16. The off-road pneumatic tire according to claim 1, wherein the tread further includes a plurality of main tie bars projecting from the body substantially outward in the radial direction, and one of the twin blocks and one of the middle blocks positioned on an outer side of the one of the twin blocks in the axial direction are connected by one of the main tie bars.

17. The off-road pneumatic tire according to claim 16, wherein the tread further includes a plurality of sub tie bars projecting from the body substantially outward in the radial direction, one of the twin blocks and the middle blocks positioned on outer sides of the one of the twin blocks in the axial direction are connected by the main tie bars, and one of the middle blocks connected by the main tie bars to the one of the twin blocks is connected by one of the sub tie bars to one of the shoulder blocks positioned on an outer side of the one of the middle blocks in the axial direction.

18. The off-road pneumatic tire according to claim 16, wherein the body includes a plurality of recess portions recessed inwardly in the radial direction, and the plurality of recess portions is positioned between the first center block and the second center block and between the third center block and the fourth center block.

19. The off-road pneumatic tire according to claim 1, wherein the body includes a plurality of recess portions recessed inwardly in the radial direction, and the plurality of recess portions is positioned between the first center block and the second center block and between the third center block and the fourth center block.

20. The off-road pneumatic tire according to claim 19, wherein the body includes a plurality of recess portions recessed inwardly in the radial direction, and the plurality of recess portions is positioned between the first center block and the second center block and between the third center block and the fourth center block.

* * * * *